United States Patent [19]

Devine, Jr.

[11] E Re. 31,560

[45] Reissued Apr. 17, 1984

[54] GRAPHITE DISC ASSEMBLY FOR A ROTATING X-RAY ANODE TUBE

[75] Inventor: Thomas M. Devine, Jr., Scotia, N.Y.

[73] Assignee: General Electric Company, Schenectady, N.Y.

[21] Appl. No.: 365,078

[22] Filed: Apr. 5, 1982

Related U.S. Patent Documents

Reissue of:

[64] Patent No.: 4,119,879
Issued: Oct. 10, 1978
Appl. No.: 788,130
Filed: Apr. 18, 1977

[51] Int. Cl.[3] ..... H01J 35/08

[52] U.S. Cl. ..... 378/125; 378/143; 378/144

[58] Field of Search ..... 378/143, 144, 125

[56] References Cited

U.S. PATENT DOCUMENTS

| | | | |
|---|---|---|---|
| 2,482,053 | 9/1949 | Zunick | 313/330 |
| 3,122,424 | 2/1964 | King | 29/195 |
| 3,649,355 | 3/1972 | Hennig | 313/311 X |
| 3,660,053 | 2/1972 | Palme | 378/144 |
| 3,719,854 | 3/1973 | Sedlatschek et al. | 313/311 X |
| 3,890,521 | 6/1975 | Shroff | 313/330 X |
| 4,132,917 | 1/1979 | Bildstein et al. | 378/144 |

FOREIGN PATENT DOCUMENTS

| | | | |
|---|---|---|---|
| 7112589 | 6/1972 | Fed. Rep. of Germany | 378/144 |

OTHER PUBLICATIONS

X rays, G. W. C. Kaye, Second Edition, 1917, pp. 38 & 39, Longmans, Green, & Co. N.Y.

*Primary Examiner*—Saxfield Chatmon, Jr.
*Attorney, Agent, or Firm*—Leo I. MaLossi; James C. Davis, Jr.; James Magee, Jr.

[57] ABSTRACT

A graphite disc assembly for a rotating x-ray tube embodying a graphite substrate and an anode target of either tungsten or tungsten rhenium joined thereto by a layer of rhodium, osmium, ruthenium, platinum, platinum-chromium, or palladium.

8 Claims, 2 Drawing Figures

GRAPHITE DISC ASSEMBLY FOR A ROTATING X-RAY ANODE TUBE

Matter enclosed in heavy brackets [ ] appears in the original patent but forms no part of this reissue specification; matter printed in italics indicates the additions made by reissue.

*This invention is related to U.S. Pat. No. 4,073,426—Devine, Jr. upon which copending reissue application Ser. No. 365,080, filed April 5, 1982 is based and U.S. Pat. No. 4,145,632—Devine, Jr. upon which copending reissue application Ser. No. 365,079, filed April 5, 1982 is based.*

BACKGROUND OF THE INVENTION

1. Field of the Invention

This invention relates to an anode assembly for rotating x-ray anode tubes, and in particular to an anode disc comprising a graphite substrate.

2. Description of the Prior Art

The longevity and efficiency of rotating x-ray anode tubes can be increased by using anode discs capable of high heat storing and high heat dissipating properties. Graphite possesses an exceptionally high thermal capacity when compared to molybdenum and tungsten, other materials used for making the substrate of the disc. At 1000° C., the ratio of thermal capacity, in relative units, and in the order mentioned heretofore, is 48:7.4 and 48:4.1. The ratio of emissivity at 1000° C. is 0.85:0.15 in both instances. However, the difficulty in using graphite as a substrate material is the problem of how to join the anode target to the graphite substrate.

Prior art anode assemblies embodying a graphite substrate suggest the use of zirconium hafnium as a suitable material for joining the anode target to the graphite substrate. However, both of these materials are carbide formers and present the problem of how to minimize the amount of carbide formed during the joining operation, as well as the desired working lifetime of the anode assembly, usually 10,000 x-ray exposures, minimum. The working lifetime subjects the anode assembly temperature to being cycled to reasonably high levels, the order of 1200° C., and, therefore, continued carbide formation is a distinct possibility. The mechanical properties of a carbide layer formed in such an anode assembly may preclude the use of such an anode assembly in rotating x-ray anode tubes subjected to large amplitude thermal cycling.

Rhenium has been employed as a material for joining the anode target to the graphite substrate. Rhenium does not form a carbide at the temperature of joining or at the operating temperature of the tube assembly. However, the solubility of carbon in rhenium is relatively high and permits the diffusion of carbon therethrough and into the material comprising the anode target. Consequently, the material of the anode target may be embrittled by the formation of tungsten carbide. As a result, the operating lifetime and efficiency of such anode assembly designs are the same as, or less than, that of currently employed all-metallic anode assemblies.

It is therefore an object of this invention to provide a new and improved anode assembly for a rotating x-ray anode tube wherein the substrate of the disc is made of graphite.

Another object of this invention is to provide a suitable material for joining the anode target to a graphite substrate wherein the material is a non-carbide former and has a low solubility for carbon at the maximum, bulk operating temperature of a rotating x-ray anode tube.

Other objects of this invention will, in part, be obvious and will, in part, appear hereinafter.

SUMMARY OF THE INVENTION

In accordance with the teachings of this invention there is provied a disc assembly for a rotating x-ray anode tube wherein an anode target comprising tungsten or tungsten alloy is brazed to a graphite substrate. The brazing materials may be platinum, a platinum-chromium alloy, osmium, palladium, rhodium or ruthenium.

DESCRIPTION OF THE INVENTION

Figure 1:
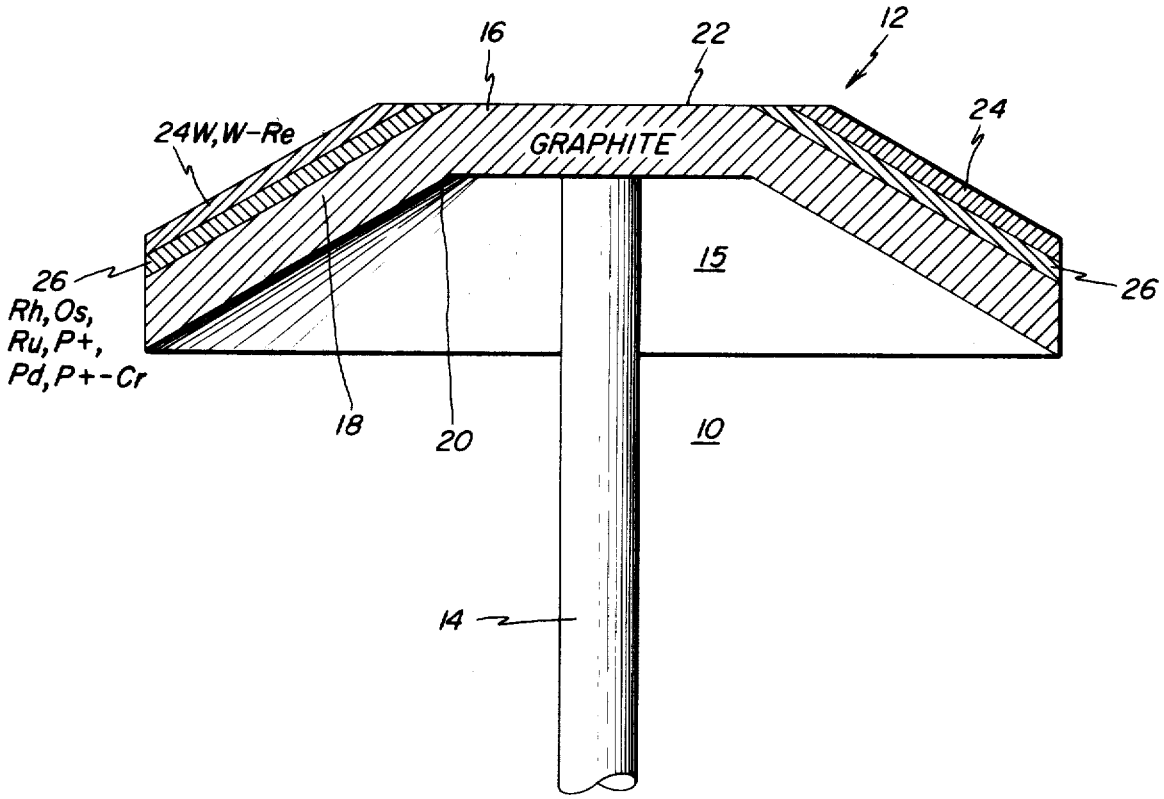
FIG. 1 is an elevation view, in cross-section, of a disc assembly.
Figure 2:
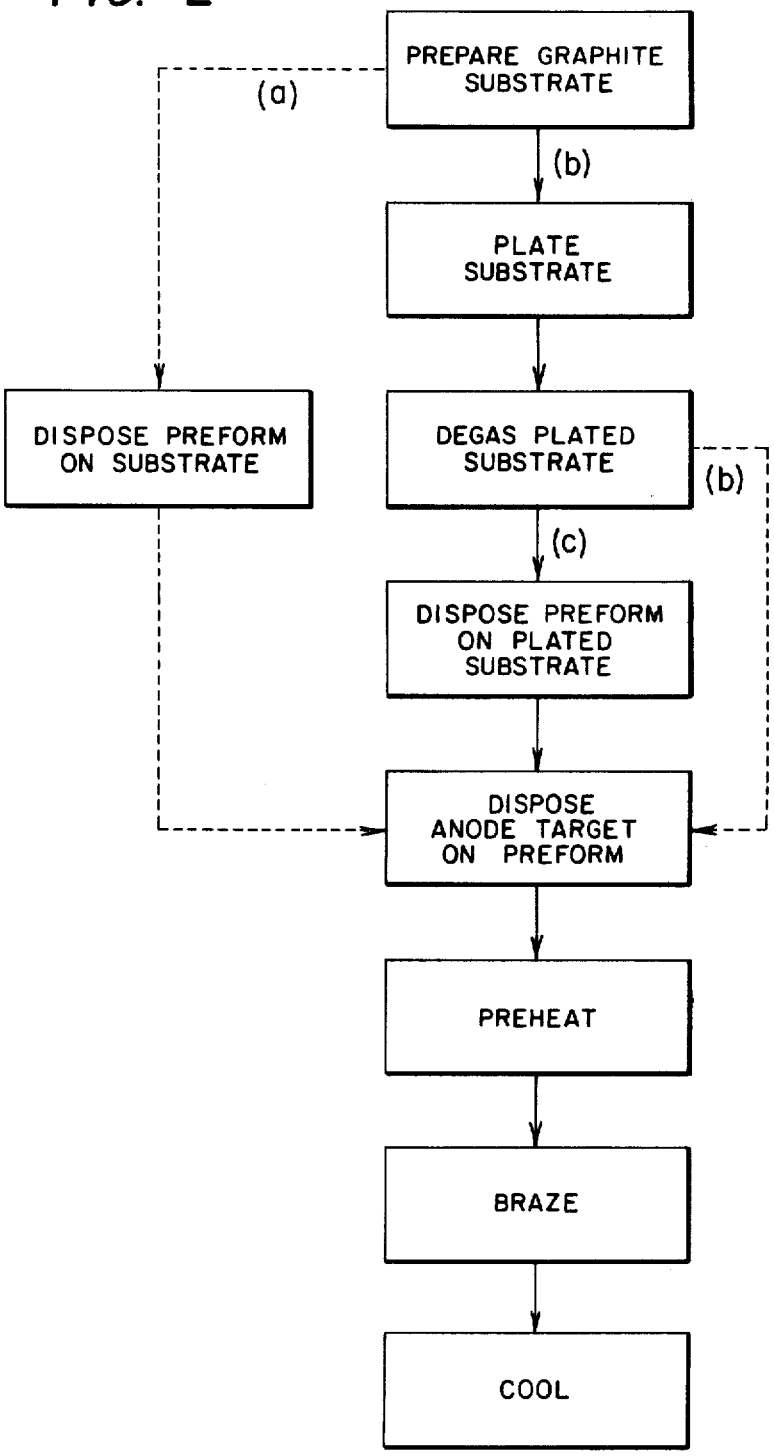
FIG. 2 is a flow diagram of several methods of joining an anode target to a substrate.

Referring now to FIG. 1, there is shown an anode assembly 10 suitable for use in a rotating x-ray anode tube. The anode assembly 10 includes a disc 12 joined to a stem 14 by suitable means such, for example, as by brazing, welding and the like. The disc 12 comprises a graphite substrate 15 which includes a central portion 16 and an integral outer portion 18. The substrate 15 has two opposed major surfaces 20 and 22 which comprise, respectively, the inner and outer surfaces of the substrate. The substrate 15 preferably may have a saucer-like configuration. The integral outer portion 18 defines the upwardly-extending portion of the saucer-like configuration. The inner surface of the saucer-like configuration defines the inner surface 20 of the substrate 15. An anode target 24 is affixed to a selected surface area of the outer surface 22 of the integral outer portion 18 of the substrate 15 by a layer 26 of metal.

The material of the anode target 24 is either tungsten or an alloy of tungsten and rhenium. The rhenium content may vary from 1 to about 25 weight percent but is typically from 3 to 10 weight percent.

The material of the metal layer 26 is one that is not a carbide former. Further, there should be no solubility of carbon in the material of the metal layer 26 in the range of operating temperatures which is of the order of from about 1000° C. to about 1300° C. Partial solubility of carbon in the material of the metal layer 26 is permissible at much higher temperatures, that is to say, at the temperature of joining the target 24 to the substrate 15, a solubility of carbon of from 1 to 4 atomic percent in the material of the metal layer 26 is desirable. The material should have some solubility in tungsten and the tungsten alloy of the target 24. *Although the brazed regions that develop above and below layer, or lamina, 26 are not shown in FIG. 1, the above solubility criteria assure that, under the proper processing conditions, the metal provided to yield metal lamina 26 as the barrier to carbon diffusion will melt and alloy with (i.e. be brazed to) the metal of layer 24 over the surface thereof contacting layer 24 and will melt and alloy with (i.e. be brazed to) carbon over the surface of graphite substrate 15 wet thereby.*

Suitable materials for comprising the metal layer 26 are platinum, palladium, rhodium, osmium and ruthenium. All of these materials are non-carbide formers. In addition each of the materials is soluble in tungsten and the tungsten alloy of the target 24 and has a low solubility for carbon. In particular, the solubility for carbon is practically zero at the maximum bulk operating temperature (about 1300° C.) of a rotating x-ray anode tube embodying the anode assembly 10. Platinum, palladium, rhodium, osmium and ruthenium all form a simple eutectic system with carbon. For commercial applications, however, platinum and palladium are the only practical materials to be used in the metal layer 26. Rhodium, osmium, and ruthenium, although they each have a higher brazing temperature than platinum and palladium, are too expensive at this time so as to be employed as the principle material in the metal layer 26.

Palladium is suitable for the material of the metal layer 26 as it has a minimum joining or carbon-palladium eutectic temperature of 1504° C., and nearly zero solubility for carbon at temperatures less than 1300° C. Excellent bonds are achieved between the anode target 24 and the substrate 15. However, the maximum bulk operating temperature of the anode assembly 10 is about 1300° C., allowing only a 200° C. margin of safety. Therefore, the reliability of the anode assembly 10 is less than that when platinum comprises the material of the metal layer 26.

The preferred material at this time for comprising the material of the metal layer 26 is platinum. The temperature of joining the anode target 24 to the graphite substrate 15 is about 1800° C. The minimum joining temperature, or carbon-platinum eutectic temperature is 1705° C. This provides a greater safety margin for the anode tube operation, that is 400° C. Below about 1500° C., the platinum metal layer 26 has a zero solubility for carbon. Therefore, the platinum metal layer 26 provides an excellent barrier against carbon diffusion into the anode target 24 at the operating temperature range of about 1000° C. to about 1300° C.

Alloys of platinum may also be used. However, one must not employ large concentrations of elements therein which when allowed may cause carbide formation at the joining temperature or excessive carbon diffusion in the tube operating temperature range. Although chromium is a carbide former, platinum with up to 1% by weight chromium can be employed as the metal layer 26.

Several methods may be employed to provide the platinum or platinum alloy metal layer 26. One may plate the graphite. Preferably an electroplating process is employed. A thickness of from ¼ mil to about 1 mil is preferred. Alternately, the platinum may be sputtered onto the graphite. The platinum deposition is followed by heat treating the plated graphite at about 1200° C. ±°° C. for a period of about 3 hours in vacuum to degas the plated graphite.

The metal layer 26 may be provided by employing platinum or a platinum-chromium alloy in a foil form. The thickness of the foil depends solely on the need to assure one of a good bond or joint. The foil has a thickness of at least ½ mil. Should the foil thickness be less than ½ mil, an incomplete bond may result because of the lack of intimate contact between the anode target 24 and the graphite substrate 15 due to the irregularities on each surface. Preferably the foil has a thickness of 1 mil in order to assure one of having a reliable joint formed by the metal layer 26.

The anode assembly 10 may be fabricated in several ways. In one instance the anode target 24 is disposed on the plated graphite substrate 15 and joined together at an elevated temperature of about 1800° C. In a second instance, a sandwich of graphite substrate 15, a foil of platinum or a platinum-chromium alloy and the anode target 24 is assembled and joined together at about 1800° C.

A preferred method of joining the tungsten or tungsten-rhenium alloy target anode 24 to the graphite substrate 15 includes the assembly, in a sandwich configuration, of a platinum plated graphite substrate 15, a foil member and the target anode 24. The foil member is disposed on the plated surface of the graphite substrate 15. The anode target is then disposed on the foil member. The components of the "sandwich" are held together in a suitable manner so that the surfaces to be joned together are in a close abutting contact relationship with each other.

The assembled components are placed in a controlled atmosphere furnace. The preferred atmosphere is hydrogen. The hydrogen aids the platinum wetting of the surfaces to be joined together. In addition, the hydrogen atmosphere acts as a reducing agent for any oxide present on the surface of the components to be joined together.

The assembled components are initially placed in the coolest portion of a hydrogen tube furnace and preheated for a period of time up to about 30 minutes to acclimatize the component. A minimum of 10 minutes is desired. Upon completion of preheating, the assembled components are moved into a portion of the furnace where the temperature is about 1800° C. ±30° C. The assembled components are retained in this portion of the furnace for a period of time sufficient to join the components together by brazing by formation of the layer of metal 26. A period of time up to 10 minutes has found to be sufficient, with about 3 minutes being preferred. Upon completion of the brazing step, the assembly, now the disc 12, is moved to a "cool down zone" in the tube furnace where it remains for a sufficient time to cool the components and solidify the melt to form the metal layer 26. A time of approximately 1 hour has been found sufficient to cool the disc sufficiently from a temperature of about 1000° C., in the "cool down zone" for removal from the furnace.

A layer of platinum, 1 mil in thickness, was disposed on a surface of a block of graphite, 1 inch in thickness, by electrodeposition means. The plated substrate was degassed at 1200° C. ±20° C. for a period of 3 hours. A tungsten anode target was prepared and one surface metallographically polished to 600 grit paper. A preform, 1 mil in thickness, was prepared from a foil sheet of platinum.

A sandwich was the assembled. The platinum preform was disposed on the platinum plated surface of the graphite substrate. The anode target was placed on the preform with the polished surface in an abutting contact relationship with the preform. The assembled components were bound tightly together, disposed in a molybdenum boat and placed in the coolest end of a hydrogen tube furnace. The assembled components were allowed to acclimatize for 10 minutes then moved into the hottest portion of the tube furnace. The temperature was measured by an optical pyrometer and found to be 1800° C. ±30° C. The assembled components remained in the hot zone for 3 minutes to braze the components together. The assembled components were then moved to a cooler zone in the furnace, 1000° C. ±20° C. and allowed to furnace cool from that temperature for 45 minutes before removing them from the furnace.

Upon removal from the furnace the brazed components were examined visually. The braze joint appeared sound. The brazed assembly of components was then sectioned and the tungsten-platinum-carbon interface examined. The braze joint was sound throughout. Various sections were then subjected to bending loads until fracture occurred. All fractures occurred either in the tungsten anode target or in the graphite substrate but never in the platinum-tungsten or the platinum-graphite interfaces.

The new disc assembly enables one to employ radiographic techniques which require higher power outputs for either short or long durations without the fear of premature failure during use than what could be employed by the prior art disc assemblies. The capability of being able to withstand higher power outputs enables one to expose patients for a shorter time during x-raying procedures.

I claim as my invention:

1. A disc for an anode assembly for a rotating x-ray anode tube comprising a graphite substrate having two opposed major surfaces which are, respectively, the inner and outer surface of [the] *said* substrate [and] *with each major surface having* an inner portion and an integral outer portion;

an anode target affixed to a predetermined surface area of [the] *said* integral outer portion of [the] *said* substrate wherein the material of [the] *said* anode target is one selected from the group consisting of tungsten and a tungsten-rhenium alloy;

[a layer of metal joining the anode target to the predetermined surface area of the outer surface of the integral outer portion of the substrate wherein the material of the layer of metal is one within which carbon is not soluble in the temperature range of from about 1000° C. to about 1300° C. but may have a solubility therein of from 1 to 4 atomic percent at the temperature of joining the anode target to the substrate;]

[the material of the layer of metal has some solubility in the material of the anode target;]

[the material of the layer of metal is one selected from the group consisting of rhodium, osmium, ruthenium, platinum, palladium and an alloy of platinum and chromium; and the] *a metallic layer extending between and joining said anode target and said predetermined surface area; said metallic layer consisting of a barrier metal lamina flanked on opposite sides by first and second brazed regions; the metal constituting said barrier metal lamina providing an effective barrier against carbon diffusion and being selected from the group consisting of rhodium, osmium, ruthenium, palladium, platinum and an alloy of platinum and chromium; said first and second brazed regions consisting of alloys formed with the metal selected for said barrier metal lamina; said first brazed region, in which the metal selected for said barrier metal lamina was reacted with carbon, extending between one side of said barrier metal lamina and said predetermined surface area adjacent thereto; and said metallic* layer has a thickness of at least ¾ mil.

2. The disc of claim 1 wherein the [material of the layer of] metal *of the barrier metal lamina* is palladium.

3. The disc of claim 1 wherein the [material of the layer of] metal *of the barrier metal lamina* is platinum.

4. The disc of claim [3 wherein the material of the layer of metal] *1 wherein the metal of the barrier metal lamina* is an alloy of platinum and chromium [wherein chromium comprises up to] *in which the maximum chromium content is* 1 percent by weight.

5. The disc of claim 1 wherein the substrate has a saucer-like configuration, the integral outer portion defines the upwardly exxtending portion of the saucer-like configuration, and the inner surface of the saucer-like configuration defines the inner surface of the substrate.

6. The disc of claim 5 wherein the [material of the] metal *of the barrier metal lamina* is platinum.

7. The disc of claim 5 wherein the [material of the] metal [layer] *of the barrier metal lamina* is an alloy of platinum and chromium ]wherein chromium comprises up to] *in which the maximum chromium content is* 1 percent by weight.

8. The disc of claim 7 wherein the thickness of the *metallic* layer [of metal] is 2 mils.

* * * * *